April 25, 1967 L. R. WANNAN 3,316,356

SELECTOR CIRCUIT

Original Filed June 17, 1963 2 Sheets-Sheet 1

INVENTOR
Lloyd Reive WANNAN

Robert B. Harmon

ATTORNEY

INVENTOR
Lloyd Reive WANNAN

ATTORNEY 3,316,356
SELECTOR CIRCUIT

Lloyd R. Wannan, Toronto, Ontario, Canada, assignor to The Bell Telephone Company of Canada, Montreal, Quebec, Canada Continuation of application Ser. No. 288,245, June 17, 1963. This application May 13, 1966, Ser. No. 562,021
9 Claims. (Cl. 179—18)

The disclosed selector circuit comprises an electromagnetic circuit which tests for an idle outgoing trunk connection immediately upon being seized by a previous selector and seizes an outgoing trunk if one is idle.

When the first digit for an outgoing trunk connection is dialed, the selector circuit, if an idle trunk has been seized, will respond to repeat this digit to the outgoing trunk and then cut the subscriber's loop directly to this trunk after the last pulse of this digit has been received. If an all busy condition exists the selector will respond to rotary hunt on the selector level of the first digit dialed to the 11th rotary step and return all paths busy tone to the subscriber.

When the first digit for a service code call is dialed the selector will respond to absorb this digit, release the outgoing trunk if seized, and unlock the switch so that the selector in response to the subsequent digits dialed will connect to a service code trunk or rotary hunt on the level dialed to return a busy trunk when all service code trunks are busy.

This invention relates to automatic step-by-step telephone systems and more particularly to such systems employing outgoing trunks and service connections.

This application is a continuation of my application Ser. No. 288,245 filed June 17, 1963, now abandoned.

As is well known, nationwide toll dialing systems, enabling a subscriber's station to be connected to another subscriber's station in Canada or in the United States, has been developed, and is known as Direct Distance Dialing (D.D.D.) which permits subscribers to dial toll calls.

In these systems, the nations are divided into areas called numbering plan areas (N.P.A.). Dialing procedures are such that a three digit area code, plus a three digit office code, plus a four digit subscriber's number are required in placing a call to a subscriber in some other (N.P.A.); while a call to a subscriber in the same (home) (N.P.A.) requires, only, a three digit office code, plus the four digit subscriber's code. In all cases an access code precedes the dialing of the ten or seven digit code combination. This access code may be of the "11X" type or the single digit "1" type and is used to gain access to the nationwide toll dialing network.

In the conventional step-by-step dial switching telephone systems employing "11X" service codes for service code calls and the single digit "1" for access to the toll dialing network, the first digit dialed is used to step the first selector to the level dialed (level one) allowing this selector to seize an auxiliary trunk "double headed" which in turn seizes both an outgoing trunk and a service code selector. The next digit dialed (the second) will be a "1" if the requirement is for a service code selector (service code call) or will be one of the digits from 2 to 9 if the requirement is for an outgoing trunk circuit (D.D.D. call). If the second digit is a "1" this digit is used to direct the auxiliary trunk to release the outgoing trunk and connect the subscribers loop directly to the service code selector which absorbs this digit. The next digit "X" will direct the service code selector to the level dialed to hunt for a service code trunk. If the second digit is 2–9 the auxiliary trunk, concurrently repeats this digit and routes the call through an outgoing trunk to the toll switching centre so that the call is switched to the distant subscriber's station in accordance with the second and subsequent digits dialed.

An advantage of this invention is to permit a step-by-step telephone switching circuit to differentiate between the requirements for an outgoing trunk connection and a service code connection without the use of an auxiliary trunk circuit.

Another advantage of this invention is to provide a novel selector for a step-by-step telephone switching system adapted for switching service code connections or to connect to an outgoing trunk for access to a toll switching system for direct distance dialed toll calls in accordance with the first digit the selector receives. (The second digit dialed on a call.)

In accordance with the invention, the improved selector responds, when seized by a first selector, to test through an electromagnetic circuit whether an idle or a busy outgoing trunk condition exists and set itself to respond to the subsequent digits dialed in accordance with the idle or busy condition encountered at moment of seizure; also to seize the outgoing trunk if it is idle.

When the first digit for an outgoing trunk connection is dialed, this selector, if an idle trunk has been seized, will respond to repeat this digit to the outgoing trunk and then cut the subscriber's loop directly to this trunk after the last pulse of this digit has been received. If an all trunk busy condition exists the selector will respond to rotary hunt on the selector level of the first digit dialed to the 11th rotary step and return all paths busy tone to the subscriber.

When the first digit for a service code call is dialed this selector will respond to absorb this digit, release the outgoing trunk if seized and unlock the switch so that the selector in response to the subsequent digits dialed will connect to a service code trunk or rotary hunt on the level of the selector dialed to return a busy tone when all service code trunks are busy.

A better understanding of the invention may be had by referring to the following description, taken in conjunction with the drawings, in which like numbers refer to like parts, in which.

In the figures of the drawings, the relay contacts are shown detached from the relay winding. When the relay is deenergized, the contacts which are closed, known as break contacts, are represented by a short line perpendicular to the conductor line and the contacts which are open, known as make contacts, are represented by cross lines diagonally intersecting the conductor line. Each set of contacts is identified by the relay core designation of that relay together with the individual contact member.

Figure 1:
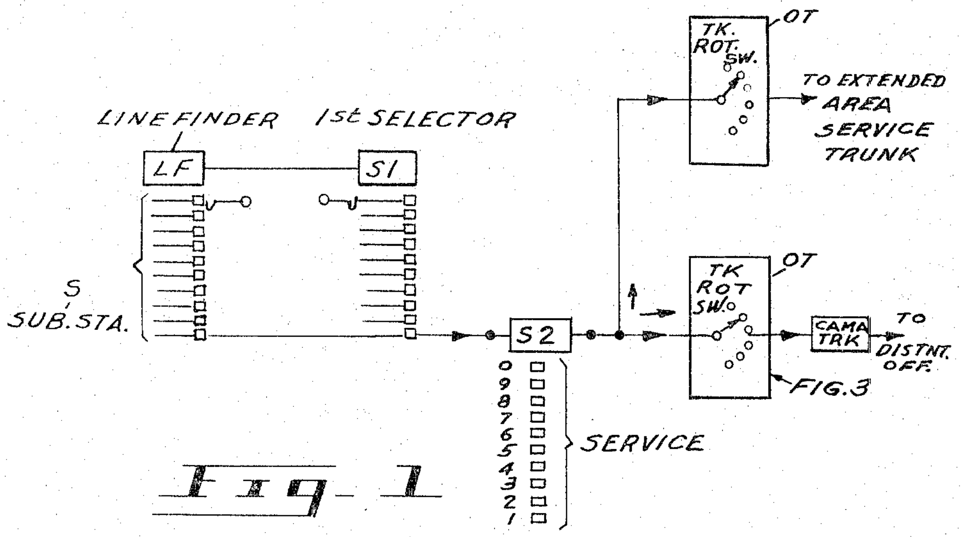
FIG. 1 illustrates a schematic diagram of a telephone system in which the selector is incorporated.

Considering the drawings, there is shown in FIG. 1, a calling subscriber's station S, a linefinder circuit and a first selector circuit LF and S1 respectively, selector S2 and outgoing trunk switching circuits OT extending to a centralized automatic message accounting (CAMA) trunk or to an extended area service trunk. The linefinder, first selector and outgoing trunk circuits are conventional equipment.

Figure 2:
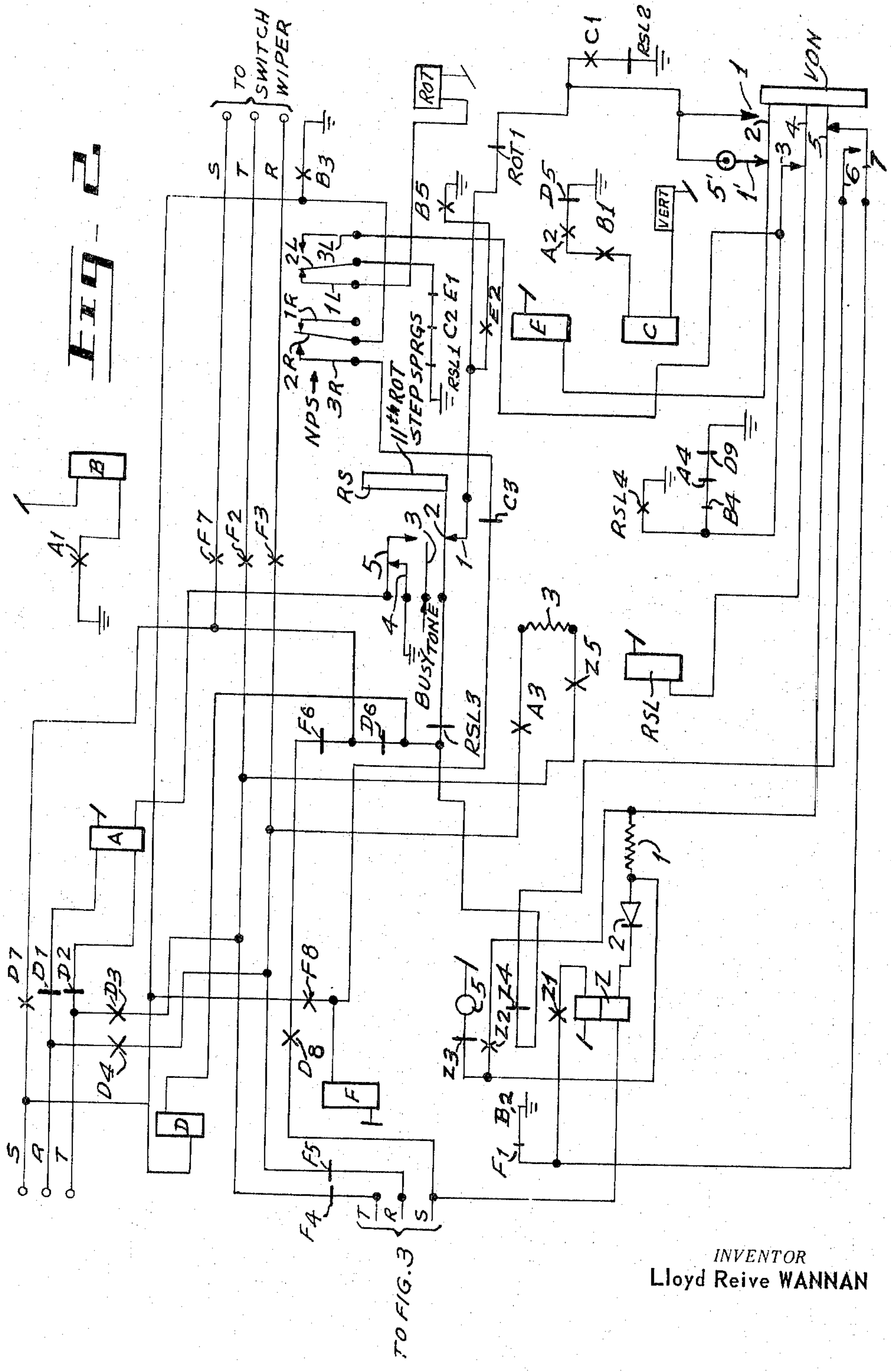
FIG. 2 illustrates a detailed circuit schematic of the selector of the invention connected to the subscriber's line.

Considering the selector S2, FIG. 2, shown in detail, there is shown the conventional line relay A, release relay B, slow to release series relay C, cut through relay D, rotary hunt relay E, vertical and rotary magnets VERT and ROT respectively, release magnet RSL, 11th rotary step springs RS, vertical off normal springs VON and normal post springs NPS. In addition to this conventional apparatus there is shown relay F which performs a switching function, relay Z having a lower and upper winding which performs a test function, resistor 1 and diode 2 in serial relationship connected between the lower winding of relay Z and the VON springs, resistor 3 being connected in the pulse repeating circuit, thermistor 5 having a timing function in conjunction with diode 2 and resistor 1, thermistor 5′ having a timed permanent release function.

Figure 3:
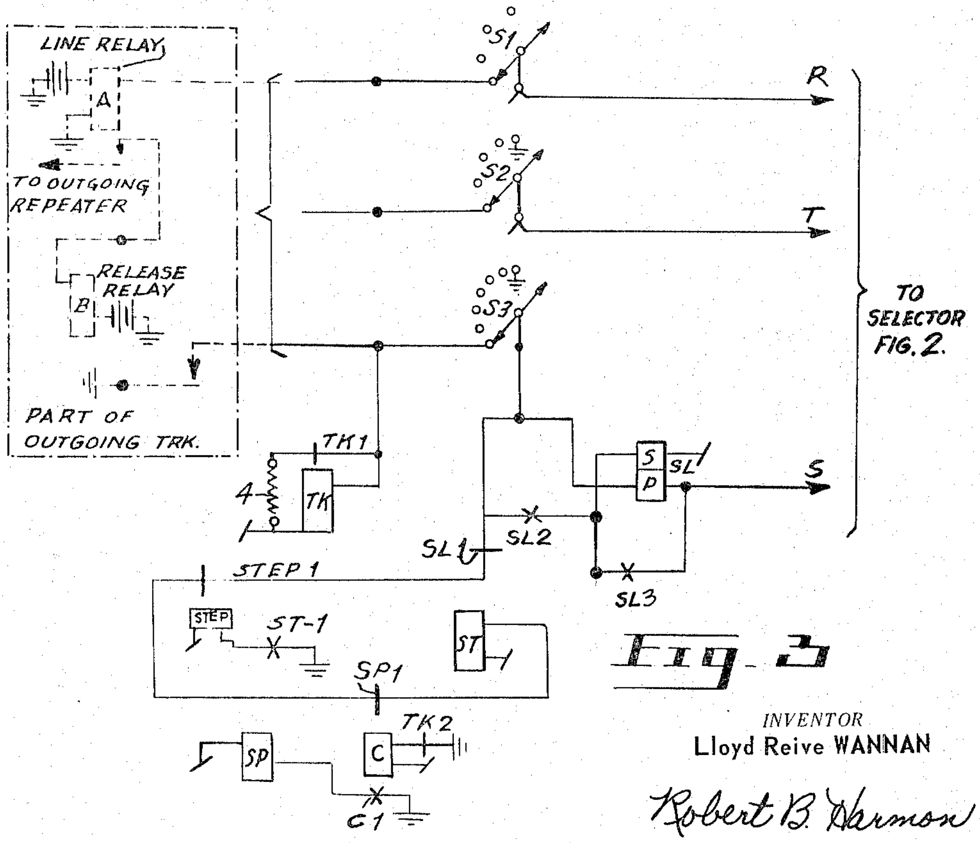
FIG. 3 illustrates the circuit schematic of a typical rotary out trunk switch which is used to connect the selector to an outgoing trunk circuit which is employed with the invention.

Shown in FIG. 3 is a typical rotary trunk switch circuit which includes sleeve relay SL, stepping relay ST, trunk relay TK, rotary step magnet STEP, switch relay SP and control relay C; also shown in FIG. 3 are rotary switch wipers and bank arc S1, S2, S3.

The operation of the selector of the invention is as follows:

The condition of springs of the normal post spring assembly NPS when this selector has been stepped to the level indicated is:

| Service Code | Spring Assembly | Normal Post Springs Arranged | | |
|---|---|---|---|---|
| | | Level 1 | Levels 2–9 | Level 10 |
| 11X | Left | Oper | Non Oper | Non Oper. |
| | Right | Oper | Non Oper | Oper. |

*Seizure of the selector*

Upon the originating of a call at the calling station, a linefinder will seek out the calling subscriber's station operating the line relay and the associated relays therein, not shown. When the calling subscriber dials the first digit, the first selector S1 will be stepped to the level dialed operating the line relay and associated relays (not shown) therein so that an idle selector S2 is automatically seized. The above is the conventional operation of this part of an automatic step-by-step telephone system.

*Preparation stepping of switch*

When the selector S2 is seized, the line relay A is operated over the circuit, energy source—relay A—D1—ring side of line—subscriber's loop, (not shown)—tip side of line—D2—A—springs 5, 4 RS—ground. When A relay operates, relay B also operates over the circuit ground—A1—relay B energy source. The vertical stepping circuit is therefore prepared over the circuit ground D5—A2—B1—relay C—vertical magnet energy source so that relay C and the vertical magnet operate when relay A releases during pulsing.

*Test of idle outgoing switch circuit*

When relay B operates as described heretofore the test circuit, ground—B2—F1—springs 7, 5, VON—resistor 1—diode 2—lower winding of Z, FIG. 2—lower wdg. SL relay—rotary switch S3—TK—energy source FIG. 3 is prepared.

It is well known that a ground is found on the sleeve of busy lines and battery on the sleeve of idle lines for a telephone system of a general nature. If the rotary switch, FIG. 3, is hunting over or standing on a busy outgoing trunk the S lead will be grounded and if the rotary switch is standing on an idle trunk the S lead will have battery on it. The Z relay, FIG. 2, therefore will be non-operated or operated in accordance with the condition encountered at the exact moment of test.

*All trunks busy*

Under this condition Z relay does not operate because no energy source exists on the S lead from the rotary switch, FIG. 3. However the circuit ground—B2—F1—VON 7, 5—resistor 1—Z3—thermistor 5—enery source will be completed, so that after a predetermined time the resistance of thermistor 5 will be lowered allowing the potential at the junction of resistor 1 and diode 2 to fall, for example, from (+) 46 volts to (−) 42 volts with respect to the ground at the rotary switch S3, FIG. 3. Diode 2 prevents relay Z from operating over the circuit, ground at rotary switch S3, FIG. 3—Z—diode 2—Z3—thermistor 5—energy source when the potential at such junction point changes from a positive to a negative state. Relay Z therefore does not operate.

When the calling subscriber dials any digit between 2–9 for an outgoing trunk (D.D.D. call), the selector S2 steps to level dialed, allowing the VON springs to operate. The closing of contacts 1, 2, VON allows the rotary hunt relay E to operate over the circuit, energy source—E—VON 1, 2—C1—RSL2 to ground. The operation of relay E which locks up over circuit B5—E2—ROT 1—VON 1, 2—E—energy source, allows the rotary magnet ROT to operate, the circuit energy source—rotary magnet ROT—1L, 2L normal post springs—E1—C2—RSL1—ground.

The operation of the rotary magnet ROT allows relay E to release which in turn allows the release of the rotary magnet. Although the wipers are in contact with the multiple bank of the level dialed they are made ineffective at this time since they are open at the non-operated F relay. Relay E however re-operates over a circuit energy source—E—VON 1, 2—ROT 1—RS 1, 2—RSL3—Z4—VON 6, 7—F1—B2—ground. The rotary magnet ROT is therefore under the control of the E relay which will continue re-operating and releasing until the switch is stepped to the 11th step.

When the rotary magnet steps to the 11th step, the operation of the 11th step rotary springs, RS, prevents the re-operation of the E relay and also the operation of the D relay, by breaking the circuit, at contacts 1, 2 of the 11th rotary step springs RS. The closing of RS springs 4 and 5 causes all trunks busy tone to be connected to the calling station, the circuit, busy tone supply—RS 3, 5—A relay—D2—subs loop—D1—A—energy source, also holds the A relay operated, thereby keeping the switch under the control of the subscriber's loop.

The first vertical step of the selector S2, opens the outgoing trunk, test ground at VON springs 5 and 7, thereby deenergizing thermistor 5 which cools out, restoring it to a high resistance state. Should the outgoing trunk circuit, on which the S2 selector's rotary switch is standing on, wink off its switch train during the time interval between the seizure of the selector S2 and the first vertical step of such selector, then the test circuit described heretofore is prevented from holding the other switch train due to the presence of the potential (−) 42 volts, above described at the junction point of resistor 1 and diode 2. Diode 2 performs two functions, firstly it prevents the ground from the busy outgoing trunk causing malfunction of the selector S2; secondly it prevents the Z relay from operating when the test lead, heretofore described, changes from a positive potential state to a predominately negative potential state.

If no digit is dialed, for the first vertical step of the selector S2, the circuit, relay D—RSL3—2, 1, RS—ROT1—5′—VON 1′ 2-relay E-energy source is complete. After a predetermined time the resistance of thermistor 5′ is lowered and relay D operates opening contacts D1—D2. The selector S2 is consequently released by the releasing of relay A.

Should an outgoing trunk, other than the trunk on which this selector's rotary switch is standing on, become idle while the test circuit heretofore described is in a negative potential state, then all the rotary switches FIG. 3, in the rotary switch group, including the rotary switch associated with the selector S2 having its test lead in a negative potential state, will rotary hunt to find the idle trunk circuit.

Since the stepping of the selector S2 is independent of relay Z, if a selector is seized before thermistor 5 has cooled down sufficiently to allow relay Z to operate the selector S2 can be stepped and because the Z relay is unoperated, the switch will respond to the digits dialed, as described heretofore and return an all trunks busy signal to the calling subscriber.

*Trunk available*

As described heretofore, the testing circuit for an idle outgoing trunk switching circuit is, ground—B2—F1—7,5 (VON)—1—2—lower winding relay Z-sleeve conductor, FIG. 3—SL—terminal rotary switch S3—TK—energy source FIG. 3. If an idle outgoing trunk switching circuit is encountered, relay Z operates only sufficiently to close contacts Z1. This allows relay Z to fully operate and lock-up over the circuit, ground—B2—F1—Z1—energy source.

When relay Z fully operates, contact Z2 also closes so that resistor 1 is shunted out of the circuit, the testing circuit described heretofore, allowing the circuit, ground—B2—F1—7,5 (VON)—Z2—diode 2-lower winding relay Z, FIG. 3—SL—terminal rotary switch S3—TK—energy source to operate the SL relay, FIG. 3, which locks up over contacts SL2 and SL3 to the sleeve ground placed on the rotary switch bank terminal S3 by the outgoing trunk when it was seized, as described later, by the selector. The sleeve ground causes all idle rotary switches to step off the bank terminals, of the seized trunk, in the conventional manner. The TK relay also operates over the same circuit which operated the SL relay. It remains operated for the duration of the call and performs a conventional chain function in connection with an all trunks busy condition.

The operation of relay TK also allows contact TK2 to open so that relay C, FIG. 3, releases allowing contact C1 to close so that relay SP operates. The operation of relay SP allows contact SP1 to open thus preventing further stepping of the other rotary switches, when last idle trunk is seized.

Additionally the operation of relay Z opens contact Z3 so that thermistor 5 is removed from the testing circuit, closes contact Z5 to complete the pulse repeating circuit to the outgoing trunk formed by the tip conductor to FIG. 3—F4—Z5—resistor 3—A3—F5—ring conductor to FIG. 3. This pulse repeating circuit seizes the outgoing trunk which in turn causes a ground to be connected to the sleeve conductor in preparation to hold the switch train, as described later, when the D relay in the selector operates. The above circuit in FIG. 3, ground from outgoing trunk on S conductor—S3—S conductor to selector FIG. 2, D8. Further the operation of relay Z, contacts Z4, opens the circuit for operating the E relay when an all trunks busy condition is encountered, thereby preventing the selector from hunting to the 11th rotary step under idle trunk condition. The above circuit is energy source—E—VON 1,2—ROT 1—RS 1,2—RSL3—Z4—VON 6,7—F1—B2—ground.

The selector is now ready to receive the first digit for an outgoing trunk call and the relays operated are A, B and Z.

The selector, having the A, B and Z relays operated, is now ready to receive the first digit for an outgoing trunk call. The selector, in response to the first digit dialed for an outgoing trunk call, will step, vertically to the level dialed and simultaneously repeat the pulses of this digit to the outgoing trunk circuit. The vertical stepping is performed in the conventional manner. The pulses of the first digit are repeated to the outgoing trunk, over the circuit heretofore described, by the opening and closing of A relay springs A3. When the selector has reached the level dialed, the C relay releases and closes the circuit, energy source ROT—normal post springs 1L, 2L—E1—C2—RSL1—ground, operating the rotary magnets, which rotates the wipers one step, and release the E relay by the opening of the rotary interrupter springs ROT 1. The E relay released opens the Rotary Magnet operating circuit at E relay springs E1, thereby releasing the rotary armature which on restoring to normal closes the circuit, energy source—E—VON 1, 2—ROT 1—RS 1,2—RSL3—D—B3—ground, to operate the D relay. Relay E does not operate due to the high resistance of the D relay in series with the E relay. The D relay, when operated, disconnects contacts D1 and D2 from the A relay, closes contacts D3 and D4 so that the calling station is connected to the outgoing trunk circuit through contacts F4 and F5 of relay F which is released.

The operation of the D relay extends the outgoing trunk's sleeve ground, heretofore described, over D relay D8 springs to the preceding switch train, the circuit, sleeve ground from FIG. 3—D8—F6—D7—S conductor to preceding selector, thereby holding all the switches in the switch train.

The operation of relay D also opens the release magnet circuit at contact D9 of the relay D. The release of relay A by the opening of contacts D1, D2, opens contacts A1 and allows relay B to release. When relay B releases, the circuit of the release magnet RSL is prepared by the closing of contact B4 as described heretofore and the Z relay is released by the opening of contacts B2 of the B relay. Relay D is held operated by the ground from the outgoing trunk circuit. Z relay releasing and the release of the A relay opens the pulse repeating circuit to the outgoing trunk at Z relay contacts Z5 and A relay contacts A3.

When the calling station disconnects, the ground is removed from the D relay by the outgoing switching trunk circuit beyond, allowing this relay D to release and the preceding switches in the switch train. The release of relay D eenrgizes the release magnet RSL over the circuit, energy source—B4—A4—D9 to restore the selector S2 to normal.

*Service code call*

When the digit 1 is dialed, the selector S2 steps to this level. As described heretofore, the normal post springs left and right are operated. Relay F operates over the circuit, ground—B3—2R, 3R NP springs—C3—relay F-energy source. Relay F locking up through F8—B3—ground. When relay F operates, contacts F2, F3 and F7 close so that the selector S2 wipers are made effective. The switch now functions under the control of succeeding digits to switch service code calls. The F relay also opened B2 ground at F1 allowing the Z relay to release thereby opening the pulsing loop at Z5 to release the outgoing trunk circuit connected to FIG. 3. Relay F in operating opened the circuit to the outgoing trunk at F relay contacts F4, F5 and F6.

Under the above condition, if the digit zero is dialed in error, then the selector S2 will step to the tenth level where an intercepting trunk will be encountered indicating to the calling station that there is no such number. The normal post springs are made to close 2R and 3R to operate the F relay as heretofore described. The relay F operates simultaneously with the first rotary step.

*Absorption of the first digit*

In some automatic telephone systems, employing outgoing trunk switching circuits, it is the practice to absorb the first digit, generally the digit 1, dialed when a service code selector is required. The more common reason for this procedure is to nullify any prevalence of the stimulation of such digits from a defective line or station. In the universal system of numbering it is the procedure to conserve such digit for digit 1 access to the toll switching networks for direct distance toll dialing. The dialing of the first digit therefore seize the S2 selector which allows this selector to function under the control of succeeding pulses to remain connected to an outgoing switching circuit or to a service code selector.

When the service code employed is 11X and the selector reaches level one, the C relay releases, the circuit, energy source—RSL—4, 3 VON—3L—2L—E1—C2—RSL1—ground is completed. The release magnet RSL operates locking up on the circuit, ground—RSL 4—3, 4 VON—RSL—energy source. The operation of the release magnet RSL restores the selector switch shaft to normal.

When the shaft of the selector S2 returns to normal the VON springs open thus releasing the release magnet RSL and the E relay. Under this condition cam springs 2R and 3R also close to operate the F relay over the circuit, ground—B3—2R—3R—NPS—C3—relay F-energy source. This relay F locks up over F8—B3—ground, thereby releasing the Z relay at F1, which in turn release the outgoing trunk circuit. The selector will continue to absorbe all digit "1" until the succeeding digit directs the switch to a service code level. If the next digit dialed is other than a digit 1 then the switch steps vertically as described heretofore regardless of the position of the normal post springs and will rotary hunt on the level dialed to select an idle service code trunk circuit or if all are busy, rotate to the 11th step and return an all trunks busy tone to the calling subscriber.

What is claimed is:

1. A selector circuit for a step-by-step telephone switching system adapted to differentiate between the requirements of a calling station for an outgoing trunk connection or a service code trunk connection comprising:

(a) means responsive to seizure of the selector circuit for testing for an idle outgoing trunk circuit and for seizing an outgoing trunk circuit if one is idle;

(b) means responsive to dialing of a first digit for an outgoing trunk when an idle trunk has been seized to repeat the digit dialed to the outgoing trunk circuit;

(c) a first relay means also responsive to the dialing of the first digit for an outgoing trunk to connect the calling station directly to said outgoing trunk after the last pulse of this digit has been received; and (d) a second relay means responsive to dialing of a first digit for a service code trunk circuit to release the outgoing trunk if seized and connect the calling station to the service code trunk.

2. A selector circuit as defined in claim 1 wherein said testing means is an electromagnetic relay which is energized by an idle outgoing trunk to seize said outgoing trunk.

3. A selector circuit as defined in claim 2 wherein said testing means includes a diode connected in series with said relay and means for biasing said diode to prevent the selector circuit from seizing a busy outgoing trunk.

4. A selector circuit as defined in claim 3 wherein said biasing means comprises a negative source of potential connected in series with a thermistor and a resistor, the junction point of the thermistor and the resistor being connected to the anode of the diode so that after a predetermined time interval the resistance of the thermistor is lowered allowing the potential at the anode to become negative thus preventing conduction of the diode and energization of the relay.

5. A selector circuit as defined in claim 1 including a selector switch, a vertical magnet responsive to dialing of the first digit for stepping the selector switch to the level dialed, a rotary hunt relay and a rotary magnet under the control of the rotary hunt relay for stepping the wipers of the selector switch to the 11th step once the selector has reached the level dialed when all the outgoing and service trunks are busy, and a busy tone signal source adapted to be connected to the calling station when the selector wipers are stepped to the 11th step.

6. A selector circuit as defined in claim 2 including a selection switch a vertical magnet responsive to dialing of the first digit for an outgoing trunk for stepping the selector switch vertically to the level dialed, a rotary hunt relay, a rotary magnet under the control of the rotary hunt relay, for stepping the wipers of the selector switch when the selector switch has reached the level dialed, the operation of the electromagnetic relay preventing the rotary hunt relay from stepping the selector wipers further than the first step, and operating said first relay means to connect the calling station to the idle outgoing trunk.

7. A selector switch as defined in claim 6 wherein said testing means includes a diode connected in series with said relay and means for biasing said diode to present the selector from seizing a busy outgoing trunk.

8. A selector circuit as defined in claim 7 wherein said biasing means comprises a negative source of potential connected in series with a thermistor and a resistor, the junction point of the thermistor and the resistor being connected to the anode of the diode so that after a predetermined time interval the resistance of the thermistor is lowered allowing the potential at the anode to become negative thus preventing conduction of the diode and energization of the relay.

9. A selector circuit as defined in claim 1 including a selector switch, a vertical magnet responsive to dialing of the first digit for a service code call to step the selector switch vertically to the level dialed, a release magnet adapted to become energized upon stepping of the selector switch to the level dialed to restore the selector switch to normal thereby absorbing the digit dialed, the stepping of the selector switch to the service code level dialed operating said second relay means for releasing the outgoing trunk if initially seized and for rendering the wipers of the selector switch effective so that when the next digit is dialed the selector switch will step vertically and connect to the service code trunk.

References Cited by the Examiner

UNITED STATES PATENTS

| | | | |
|---|---|---|---|
| 2,660,619 | 11/1953 | Kessler | 179—18.7 |
| 2,709,203 | 5/1955 | Buchner | 179—18 |
| 2,769,862 | 11/1956 | Confield | 179—18 |
| 2,921,982 | 1/1960 | Lomax | 179—18.7 |
| 2,987,580 | 6/1961 | Burgener | 179—18.7 |

KATHLEEN H. CLAFFY, *Primary Examiner.*

L. A. WRIGHT, *Assistant Examiner.*